United States Patent
Berwert et al.

(10) Patent No.: US 7,116,024 B2
(45) Date of Patent: Oct. 3, 2006

(54) ELECTRIC MOTOR AND METHOD FOR ITS PRODUCTION

(75) Inventors: Mathias Berwert, Alpnach-Dorf (CH); Hans Arnold, Kägiswil (CH); Rolf Aregger, Ebikon (CH)

(73) Assignee: Leister Process Technologies, Sarnen (CH)

( * ) Notice: Subject to any disclaimer, the term of this patent is extended or adjusted under 35 U.S.C. 154(b) by 0 days.

(21) Appl. No.: 10/940,217

(22) Filed: Sep. 13, 2004

(65) Prior Publication Data

US 2005/0062351 A1    Mar. 24, 2005

(51) Int. Cl.
*H02K 5/00*  (2006.01)
(52) U.S. Cl. .......................................... 310/89; 310/258
(58) Field of Classification Search ............ 310/89–91, 310/194, 179, 254, 258–259
See application file for complete search history.

(56) References Cited

U.S. PATENT DOCUMENTS

| | | | |
|---|---|---|---|
| 4,634,908 A | | 1/1987 | Sturm |
| 4,818,911 A | * | 4/1989 | Taguchi et al. ............. 310/259 |
| 4,825,114 A | | 4/1989 | Ohtsuka et al. |
| 5,023,925 A | | 6/1991 | Goll et al. |
| 5,117,138 A | * | 5/1992 | Trian ............................. 310/89 |
| 5,436,519 A | * | 7/1995 | Takahashi et al. ........... 310/217 |
| 6,144,135 A | | 11/2000 | Ho |
| 6,274,957 B1 | * | 8/2001 | Mahn et al. ................... 310/89 |

FOREIGN PATENT DOCUMENTS

| | | |
|---|---|---|
| DE | 36 29 049 | 3/1988 |
| JP | 10322962 | 12/1998 |

* cited by examiner

*Primary Examiner*—Thanh Lam
(74) *Attorney, Agent, or Firm*—Bachman & LaPointe, P.C.

(57) ABSTRACT

An electric motor having a stator with a plurality of radially arranged pole shoes between which slots are arranged, a rotor which rotates within the stator and has a rotor shaft which is mounted on both sides of the rotor, isolating stars for covering the end faces of the pole shoes, a stator winding which is situated in the slots and surrounds the end-face isolating stars, and an outer stator casing, in which the stator winding uses the isolating stars to secure the rotor and, at the respective end, encloses the rotor bearings and the rotor in its position in the stator. The isolating stars are formed such that they may firstly accommodate the bearings for the rotor shaft and furthermore also may accommodate bearings for attachment of supports for accommodating the electronic circuits for electronic commutation. An electric motor of this type is distinguished by the capability to operate for long periods continuously, accompanied by high rotational speeds and small dimensions.

9 Claims, 5 Drawing Sheets

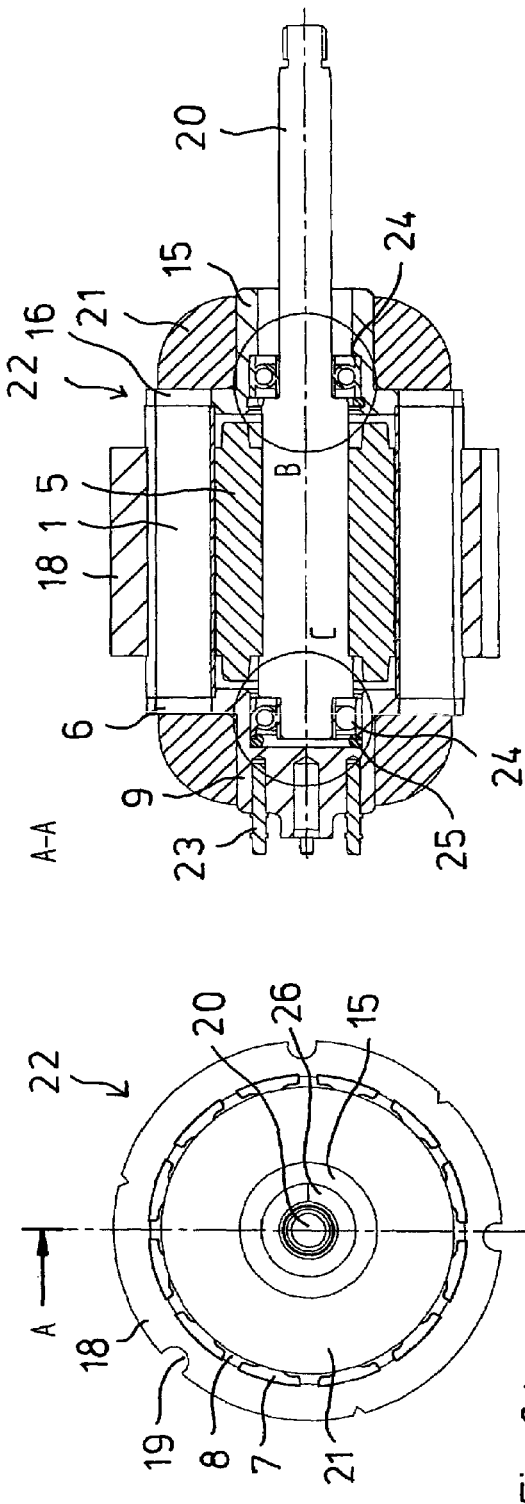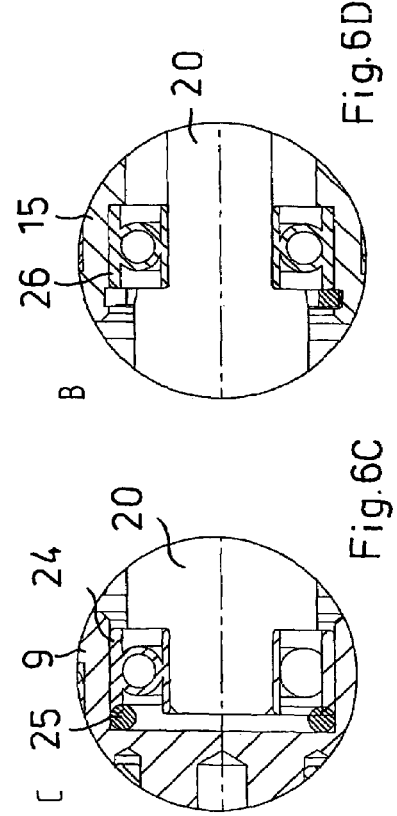

ELECTRIC MOTOR AND METHOD FOR ITS PRODUCTION

BACKGROUND OF THE INVENTION

The present invention relates to an electric motor having a stator with a plurality of radially arranged pole shoes between which slots are arranged, a rotor which rotates within the stator and has a rotor shaft which is mounted on both sides of the rotor, isolating stars for covering the end faces of the pole shoes, a stator winding which is situated in the slots and surrounds the end-face isolating stars, and an outer stator casing, and also to a method for the production of an electric motor of this type.

Motors which are as small and as powerful as possible are required for continuous operation of relatively small devices, for example hot-air devices and fans, particularly those used in the manufacturing sector and which must operate continuously. Motors known as universal motors are used in existing devices. Natural wear of the brushes and also of the commutator means that the use of these motors in applications involving continuous operation is limited. In this case, it is possible to introduce electronic commutation but, for design reasons, a different, more powerful motor having the same or even smaller dimensions would then have to be chosen. One option is to use an asynchronous motor, but these are relatively complex to produce and in terms of design have a volume which means an asynchronous motor of current dimensions cannot be installed in hand-held devices of the type in question. Therefore, for this application in particular, electric motors having a diameter of well below 100 mm along with the required power would be desirable. In this context, the journal Schweizer Maschinen Markt (SMM) 31/32, issue 8, 2003, states on pages 149 to 154 that no motor with purely electrical excitation, including amongst others asynchronous machines, is suitable for small drives having a diameter of below 100 mm.

The basic principle of the electric motor specified in the introduction has long been known and is described in DE-C-833 978 and DE-C-967 387. In the case of rotors and stators of electric motors, it is also known to provide an isolating star at the two ends of the rotor or stator formed by laminates being placed against one another (cf. DE-38 42 800-C2 for the rotor of a DC motor). EP-0 445 367-A1 describes an electric motor which has a stator having a plurality of radially arranged magnetic pole pieces. Slots, in which windings are arranged, are located between the magnetic pole pieces. A rotor which rotates within the stator has an isolating arrangement for covering the pole pieces and has an isolating cover which engages over part of the end surface of the rotor which rotates within the stator. The stator winding is wound after the rotor has been inserted into a coil former to which the laminated core of the stator is fitted, with the result that the rotor is wound after the winding has been fitted, but without it being borne in the housing (which will be fitted later) and can no longer be removed.

One object of the present invention is to propose an electric motor with electronic commutation which is suitable for continuous operation, in particular of hot-air devices, at high rotational speeds and also has a diameter in the range considerably less than 100 mm. Another object of the invention is also to propose a hot-air welding device having a motor of this type.

SUMMARY OF THE INVENTION

According to the invention, the object relating to the electric motor is achieved by having a stator with a plurality of radially arranged pole shoes between which slots are arranged, a rotor which rotates within the stator and has a rotor shaft which is mounted on both sides of the rotor, isolating stars for covering the end faces of the pole shoes, a stator winding which is situated in the slots and surrounds the end-face isolating stars, and an outer stator casing, wherein the stator winding uses the isolating stars to secure the rotor and, at the respective end, encloses the rotor bearings and the rotor in its position in the stator.

In accordance with the above, the electric motor according to the invention has a stator winding which uses the isolating stars to secure the rotor and, at the respective end, encloses the rotor bearings and the rotor in its position in the stator. The rotor can therefore no longer be separated from the stator once the latter has been wound. The advantage of this design is that production is cost-effective due to the use of existing winding systems, as are used, in particular, for winding internal rotors. At the same time, a motor having a diameter which is considerably lower than 100 mm, but is suitable for rotational speeds in the range above 18,000 revolutions per minute and has sufficient power of up to 200 watts, can be produced. Greater powers are of course possible with larger dimensions. However, these dimensions are limited in the case of relatively small devices.

In accordance with one preferred embodiment of the electric motor, bearing seats for accommodating the bearings are arranged in the center of the isolating stars and at one end are advantageously in the form of a sleeve for accommodating a bearing to allow the rotor shaft to pass through, and at the other end are in the form of a pot for accommodating the bearing and axial compensating elements. Therefore, a bearing seat for any type of bearing, in the present case for a fixed bearing and a movable bearing, is produced with simple components. In the corresponding embodiment, the isolating star may easily be produced as an injection-molded plastic part.

In accordance with a further embodiment of the electric motor, a support for accommodating electrical connection elements and/or circuit elements and/or the connections of the windings is located on the pot-like bearing seat on the side of this isolating star facing away from the stator. Therefore, the electronic circuits required for controlling the motor and for electronic commutation and other control/regulation measures can be accommodated in a very small space, in particular for accommodation in relatively small devices.

So that the stator can keep its cylindrical shape, the isolating stars advantageously have devices for centering the laminated core of the stator which are arranged on the side facing the pole shoes and adjoining the bearing seats. These devices are expediently each a rim which protrudes out of the plane of the isolating star, encircles the central opening for accommodating the bearings, engages on the inside of the stator core and centers said core with respect to the isolating stars and the central shaft in which the rotor shaft is located.

As is known, the stator casing, in the form of a yoke, surrounds the stator. According to a further advantageous embodiment, the stator casing is secured by two end-face ring flanges which are connected to one another by screwed connections, the bolts of the screwed connections running between the two ring flanges in the slots arranged on the outer circumference of the stator casing. As a result of these additional measures, the bolts project only slightly beyond the outer circumference of the stator casing and thereby likewise reduce the diameter of the entire motor.

The electric motor preferably has, on the rotor shaft, at least one fan impeller for a fan and is integrated, together with the fan impeller, in a housing for a hot-air welding device. For this purpose, the hot-air welding device has an elongate housing comprising a cylindrical handle part in which the motor and the motor controller are integrated, a cylindrical region, adjoining said handle part and having a fan which is driven by the motor, and adjoining said cylindrical region, an essentially cylindrical heating region. The hot-air welding device designed in this way is distinguished by ease of handling, with the amount of air being increased by approximately 30% as a result of the specially designed electric motor. Continuous operation at at least 18,000 revolutions per minute is possible with the same external dimensions of the motor.

The object is also achieved by a method for the production of an electric motor of the type mentioned in the introduction and having the features of the method claim. The electric motor is produced by bearings for the rotor shaft being inserted into the isolating stars, the rotor shaft of the rotor then being introduced into the laminated core of the stator, the isolating stars being fitted to the end faces with the bearings, and the rotor thus being held in the stator. The stator is then wound with the end-face isolating stars, and finally, the stator casing is placed over the wound stator and secured.

BRIEF DESCRIPTION OF THE DRAWINGS

The invention is explained in greater detail below with reference to an exemplary embodiment in the form of an asynchronous motor having a squirrel-cage rotor. In the drawings:

FIG. 6 shows a view of the electric motor from an end face (FIG. 6A); a section illustration along the line A—A (FIG. 6B); and enlarged details of the two bearing seats (FIG. 6C and FIG. 6D);

DETAILED DESCRIPTION

Figure 1:
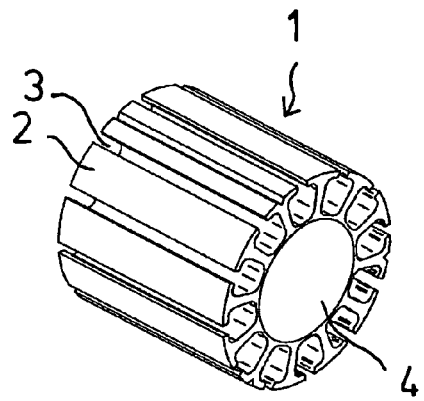
FIG. 1 shows a perspective illustration of the stator.

FIG. 1 shows the stator 1 (which is of a design known per se) for an outer winding with the pole shoes 2 and slots 3 arranged between them and a central tube for accommodating the rotor. The stator comprises, in the customary manner, a core of magnetic thin laminates which are stacked one on top of the other and are clamped to each other.

Figure 2:
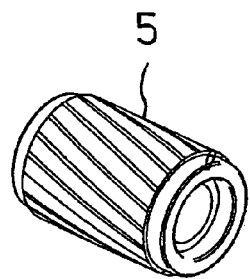
FIG. 2 shows a perspective illustration of the rotor.

FIG. 2 shows the rotor 5, without the shaft normally fitted thereto, which is in the form of what is generally known as a cage rotor or squirrel-cage rotor.

Figure 3A:
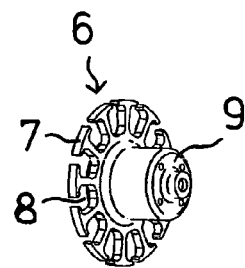
FIG. 3 shows an isolating star with a pot-like central section in a perspective illustration (FIG. 3A), in a cross-sectional illustration (FIG. 3B), and in an enlarged illustration of the encircling rim for centering the stator core (FIG. 3C)
Figure 3B:
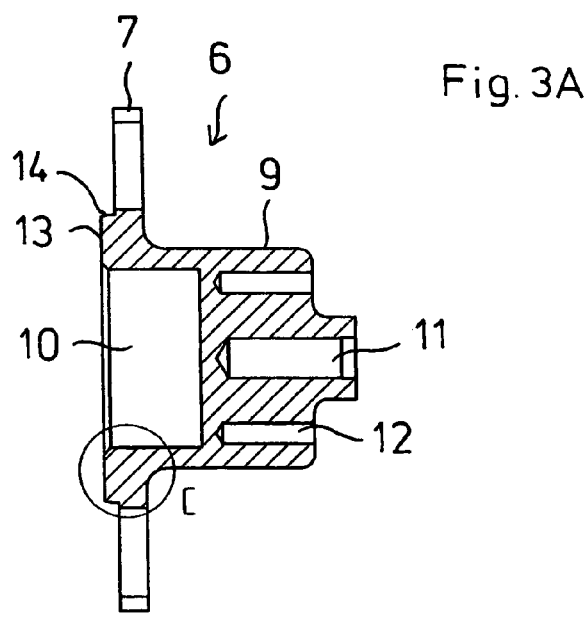
Figure 3C:
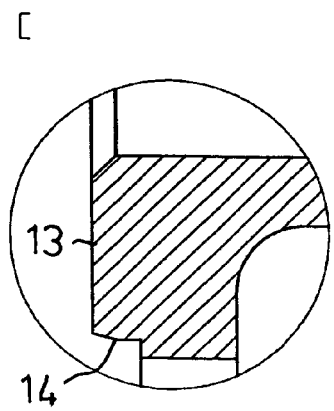

FIG. 3 shows an isolating star 6 whose outer region is formed in a manner known per se and corresponding to the shape of the pole shoes 2 and of the slots 3, in edge to cover these at the end face of the stator 1. Accordingly, the isolating star has webs 7 in the form of pole shoes, and slots 8. The isolating star 6 has a pot-like central section 9 which is shown in FIGS. 3A and 3B. The pot-like section 9 has a recess 10 for accommodating a bearing and compensating elements for forming a movable bearing. This side of the isolating star bears against the stator 1. On the opposite side of the pot-like section 9, there is a central hole 11 for accommodating a fastening screw for a printed circuit board 34 (FIG. 7) for the electronics, which can be fitted to the isolating star 6, and four holes 12 for fitting the ends of the windings and for making contact with the printed circuit board 34. As can be seen from FIG. 3B and in the enlarged illustration from FIG. 3C, the isolating star 6 has an encircling rim 13 on the side facing the stator 1, the edge 14 of which rim 13 engages in the tube 4 of the stator core 1 and thereby centers the latter.

Figure 4A:
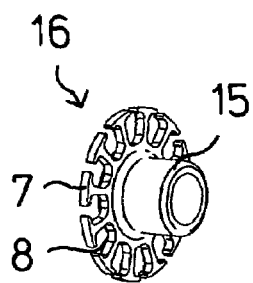
FIG. 4 shows the illustrations corresponding to FIG. 3 for an isolating star having a central section in the form of a sleeve (FIG. 4A shows a perspective view.
FIG. 4B shows a cross-sectional illustration.
FIG. 4C shows an enlarged detail)
Figure 4B:
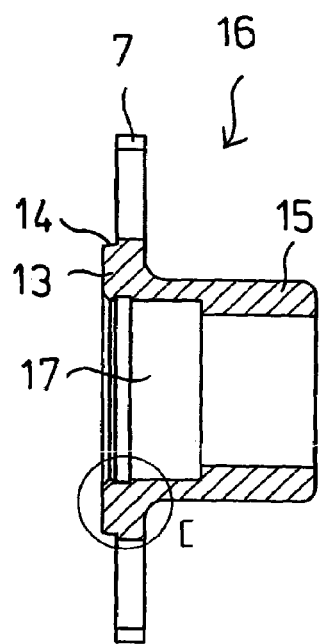
Figure 4C:
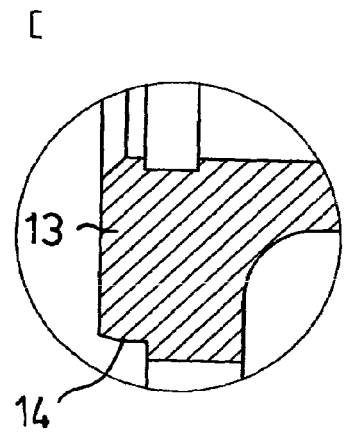

FIG. 4 shows illustrations corresponding to FIG. 3 with the rim 13 and the edge 14. In this case, the central section 15 of the isolating star 16 is in the form of a sleeve, such that the rotor shaft can pass through. On the side facing the stator core 1, there is a recess 17 with a larger diameter for accommodating a corresponding fixed bearing.

Figure 5:
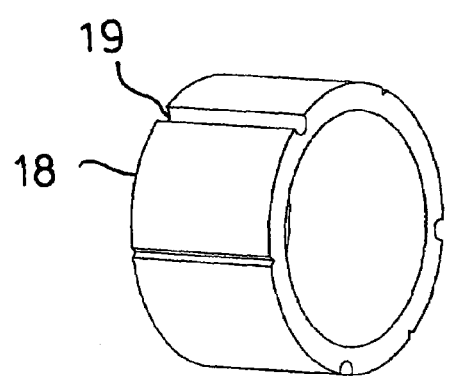
FIG. 5 shows a perspective view of the stator casing.

The stator casing 18 in FIG. 5, which, as is also known, comprises a multiplicity of thin laminate rings which are clamped to each other, has slots 19 for accommodating bolts on its circumference.

FIG. 6 shows the fully assembled electric motor 22. In a view from an end face as shown in FIG. 6A, the rotor shaft 20 which projects from the sleeve-like section 15 of the isolating star 16 can be seen. The winding 21 encloses the isolating star 16, of which only the outer ends of the webs 7 and of the slots can be seen. The entire arrangement is surrounded by the stator casing 18.

The section illustration along line A—A shows the entire arrangement of the rotor 5 in the stator 1. The stator casing 18 surrounds the stator 1 in the region of the rotor 5 which interacts with the magnetic field. Pins 23 are screwed into the holes 12 in the isolating star 6 and, during winding, the ends of the windings are wound around these pins and contact is made with the printed circuit board 34.

FIG. 6C shows an enlarged illustration of the movable bearing in the recess 10 of the isolating star 6 with a customary ball bearing 24 and a compensating device, such as a spring washer or, in this exemplary embodiment, in the form of an O-ring 25, for axial distance compensation. In a corresponding manner, FIG. 6D shows a bearing 26 which is firmly secured in the recess 17 in order to bear the rotor shaft 20. As can be seen in FIG. 6B, the winding 21 uses the isolating stars 6, 16 to enclose the rotor shaft 20, with the rotor 5 firmly secured to it, and the bearings 24, 26. These are therefore firmly connected to the stator 1.

Figure 7A:
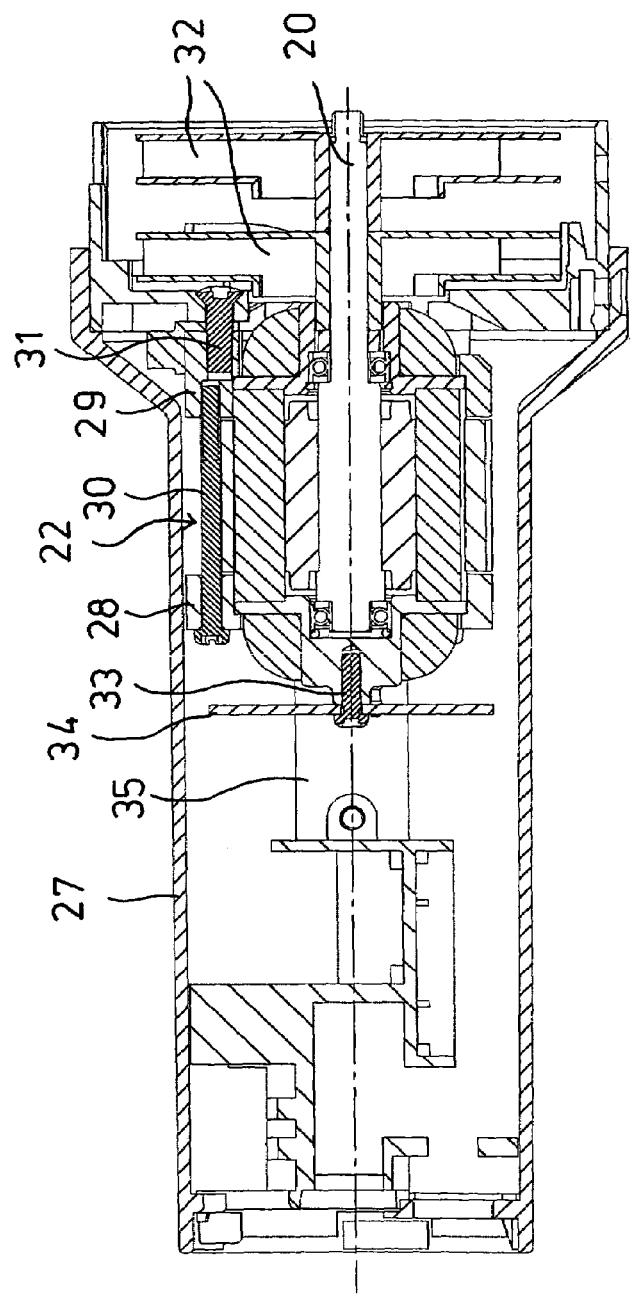
FIG. 7 shows a longitudinal section through the drive part, including the fan, of a hot-air welding device having the electric motor (FIG. 7A), and a perspective illustration (FIG. 7B)

FIG. 7 shows the electric motor, which is illustrated in the form of a section in FIG. 6B, installed in a housing 27. The stator casing 18 is held together by end-face flange rings 28 and 29 by means of screwed connections 30, the flange ring 29 being secured to the housing 27 by a further screwed connection 31. Two fan impellers 32 which are driven by means of the motor are located on the rotor shaft 20. On the opposite side, a printed circuit board 34 and supporting arms 35 connected to the flange rings 28 for securing the motor to the housing 27 are arranged by means of the central screw 33. In the exemplary embodiment, the printed circuit board 34 is shown without the necessary electronic components.

Figure 7B:
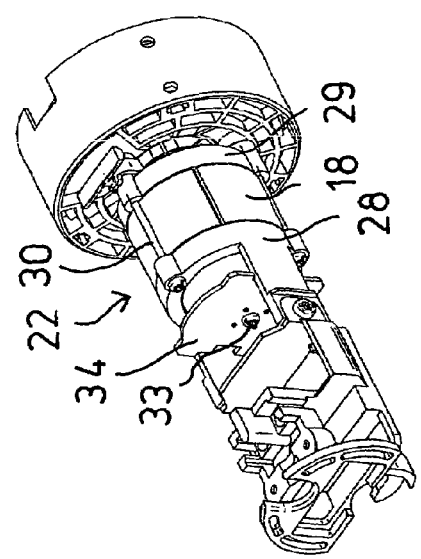

FIG. 7B shows a perspective view of the arrangement with the screw 30 inserted in the slot 19 of the stator casing 18. The electric motor is inserted into an existing housing 27 and is matched to it by the supporting arms 35, in spite of the higher power and rotational speed.

Commutation in the motor takes places without the use of brushes by means of appropriate electronics on the printed circuit board 34. Since devices of this type usually require a two-phase connection, the electronics generate a three-phase network and the corresponding commutation in a known manner.

Figure 8:
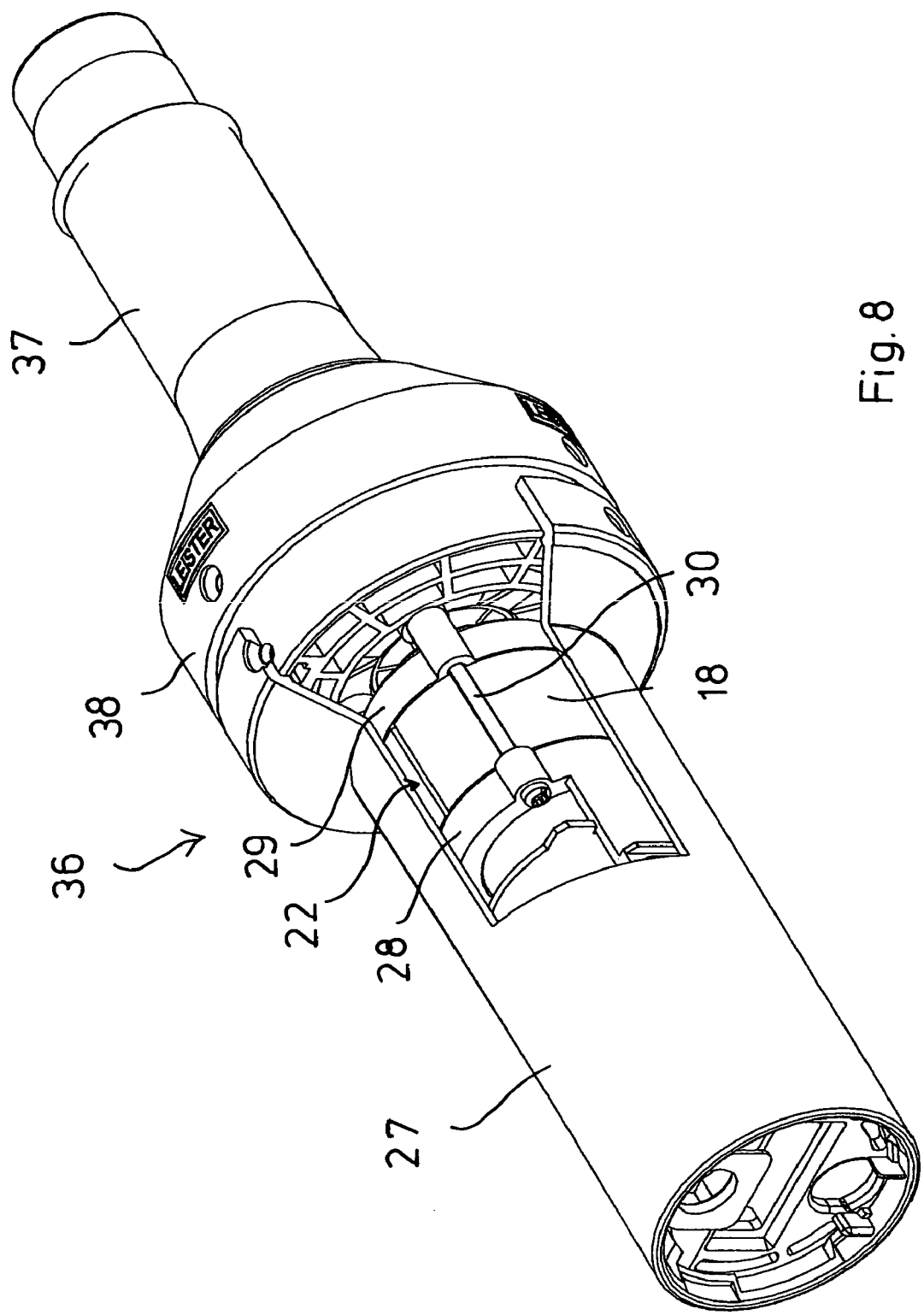
FIG. 8 shows a perspective illustration of a hot-air welding device with a cut-away section showing the electric motor.

FIG. 8 shows a hot-air welding device 36 with the housing part 27, which is shown in FIG. 7 as a handle part adjacent to the fan part 38, and the cylindrical heating region 37 and the electric motor 22 arranged in said housing part 27, only the flange rings 28, 29, the stator casing 18 and a screwed connection 30 of the electric motor 22 being visible.

The invention claimed is:

1. An electric motor comprising a stator with a plurality of radially arranged pole shoes that project outwardly to define a plurality of outer surfaces and between which slots are formed, a rotor which rotates within the stator and has a rotor shaft which is mounted on both sides of the rotor, isolating stars for covering the end faces of the pole shoes, a stator winding which is situated in the slots and surrounds the end-face isolating stars, and an outer stator casing contacting the plurality of pole shoes of the stator at their outer surfaces, wherein the stator winding uses the isolating stars to secure the rotor and, at a respective end, encloses the rotor bearings and the rotor in its position in the stator, the stator has a tubular stator core having a central stator tube for accommodating the rotor, the isolating stars are spaced apart from one another by the stator core and do not contact each other, and one of the isolating stars is provided with a plurality of retaining pins for the stator winding and/or a printed circuit board.

2. The electric motor as claimed in claim 1, wherein bearing seats for accommodating the bearings for the rotor shaft are arranged in the center of the isolating stars.

3. The electric motor as claimed in claim 2, wherein the bearing seats at one end are in the form of a sleeve for accommodating the bearing to allow the rotor shaft to pass through, and at the other end are in the form of a pot for accommodating the bearing and axial compensating elements.

4. The electric motor as claimed in claim 3, wherein a support for accommodating electrical connection elements and circuit elements and/or the ends of the windings is arranged on the pot-like bearing seat on the side of this isolating star facing away from the stator.

5. The electric motor as claimed in claim 1, wherein devices for centering the stator are arranged on the side of the isolating stars facing the pole shoes and adjoining the bearing seats.

6. The electric motor as claimed in claim 5, wherein the centering devices are in the form of a rim which juts out of the plane of the isolating star and encircles a central opening for accommodating the bearings.

7. The electric motor as claimed in claim 1, wherein the stator casing is secured by two end-face flange rings which are connected to one another by screwed connections, the screwed connections running between the two flange rings in the slots arranged on the outer circumference of the stator casing.

8. The electric motor as claimed in claim 1, wherein at least one fan impeller for a fan is arranged on the rotor shaft, and the motor is integrated in a housing for a hot-air welding device.

9. A hot-air welding device having an elongate housing comprising a cylindrical handle part in which the motor and the motor controller are integrated, a region adjoining said handle part and having a fan which is driven by the motor, and adjoining said region an essentially cylindrical heating region, distinguished by an electric motor according to any one of claims 1–7.

* * * * *